United States Patent [19]
Nakamura et al.

[11] Patent Number: 5,060,306
[45] Date of Patent: Oct. 22, 1991

[54] OPTICAL TRANSMISSON SYSTEM
[75] Inventors: Masaru Nakamura, Saitama; Hideto Furuyama, Tokyo, both of Japan
[73] Assignee: Kabushiki Kaisha Toshiba, Kawasaki, Japan
[21] Appl. No.: 554,890
[22] Filed: Jul. 20, 1990
[30] Foreign Application Priority Data
Jul. 27, 1989 [JP] Japan ................................. 1-192507
[51] Int. Cl.$^5$ ........................................... H04B 10/00
[52] U.S. Cl. .................................... 359/173; 359/184
[58] Field of Search ............... 455/608, 612, 618, 610, 455/613, 617; 375/36; 307/266

[56] References Cited

U.S. PATENT DOCUMENTS 4,354,278 10/1982 Clark et al. ......................... 455/608
4,397,042 8/1983 Tsujii et al. ......................... 455/608
4,410,878 10/1983 Stach .................................... 455/608
4,497,068 1/1985 Fischer ................................ 455/608

FOREIGN PATENT DOCUMENTS

0152901 12/1979 Japan .................................. 455/608
0044346 3/1982 Japan .................................. 455/608
0171342 9/1984 Japan .................................. 455/608

Primary Examiner—Reinhard J. Eisenzopf
Assistant Examiner—Kinfe-Michael Negash
Attorney, Agent, or Firm—Oblon, Spivak, McClelland, Maier & Neustadt

[57] ABSTRACT

An optical transmission system is provided in which an original input electric pulse is converted into two electric pulses. One is generated in response to the rising edge of the original input electric pulses, and the other is generated in response to the falling edge of the original input electric pulse. The two electric pulses have pulse widths extremely narrower than that of the original input electric pulse. Thus, the power consumption in the system can be significantly reduced.

10 Claims, 6 Drawing Sheets

OPTICAL TRANSMISSON SYSTEM

BACKGROUND OF THE INVENTION

1. Field of the Invention

This invention relates to an optical transmission system, and more particularly to an optical transmission system in which light emitted from a light-emitting element is transmitted through an optical transmission line, and received by a light-receiving element.

2. Description of the Prior Art

In recent years, an optical transmission system has been widely used, for example, between computers, or between printed circuit boards, or even between chips on such boards. However, as the signal processing speed increases, the disadvantages of the electrical transmission system have attracted considerable attention. The disadvantages include signal transfer speed reduction and cross talk, both due to distributed capacity at electrical interconnections. In addition, it has been desired to reduce power consumption (later described in detail) in the optical transmission system.

Figure 8A:
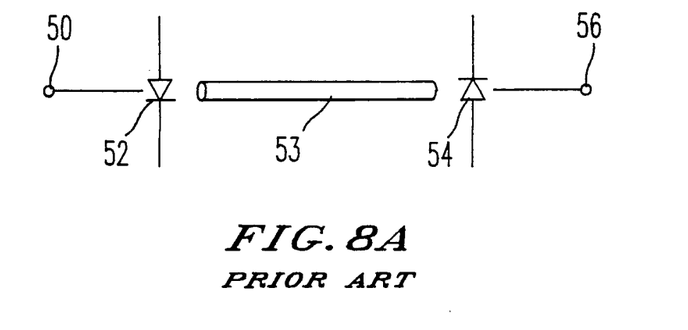
FIG. 8A is a diagram illustrating a conventional optical transmission system.
Figure 8B:
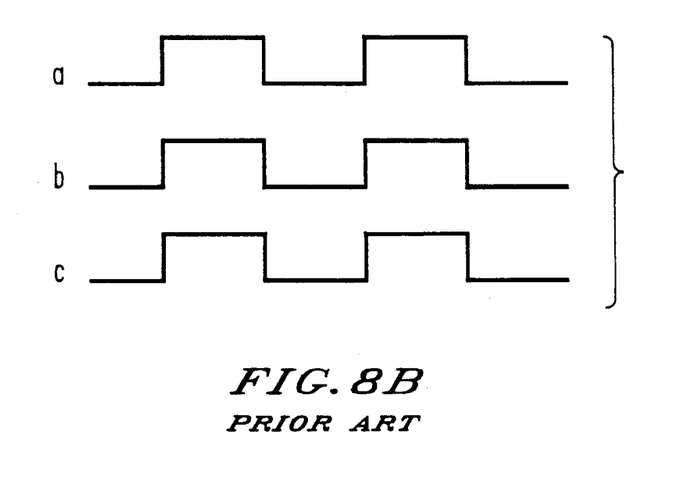
FIG. 8B is a diagram illustrating the waveforms of signals at essential portions shown in FIG. 8A.

FIG. 8A shows a schematic configuration of a conventional optical transmission system, and FIG. 8B shows signal waveforms in the system. In FIG. 8A, an input electric signal having a waveform "a" is fed into an input terminal 50 so as to energize a semiconductor light-emitting element 52. The element 52 then emits a light pulse having a waveform "b". The thus obtained light pulse "b" is transmitted to a semiconductor light-receiving element 54 through an optical fiber 53. The element 54 then produces an electric signal having a waveform "c" at an output terminal 56.

As can be seen from FIG. 8B, the input electric pulse signal "a" is converted into the light pulse "b" with substantially no change. This means that the element 52 must be energized so as to emit light during the entire ON time of the input electric pulse signal "a". It would be beneficial for the continuous power consumption to be reduced.

SUMMARY OF THE INVENTION

Accordingly, one objects of this invention is to provide an optical transmission system that can significantly reduce its power consumption with a simple configuration.

Briefly, in accordance with one aspect of this invention, there is provided an optical transmission system for transmitting a first electric signal having a rising edge and a falling edge, comprising a section for generating a first light pulse in response to the rising edge of the first electric signal and a second light pulse in response to the falling edge of the first electric signal, a section for transmitting the first and second light pulses, and a section for receiving the first and second light pulses and generating in response thereto a second electric signal corresponding to the first electric signal.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1A:
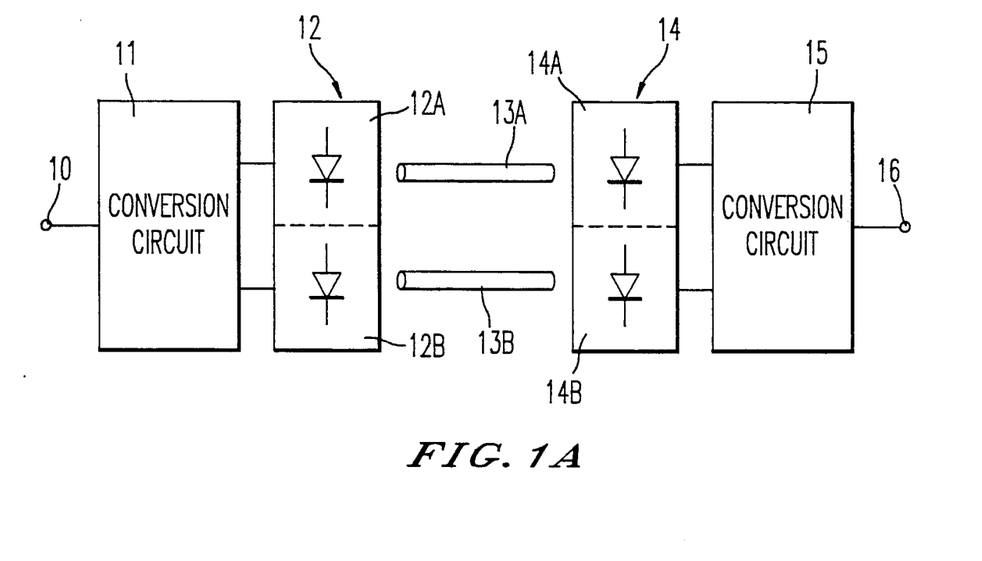
FIG. 1A is a block diagram illustrating a basic concept of one embodiment according to the present invention.

Referring now to the drawings, wherein like reference numerals designate identical or corresponding parts throughout the several views, and more particularly to FIG. 1 thereof, one embodiment of this invention will be described.

Figure 7A:
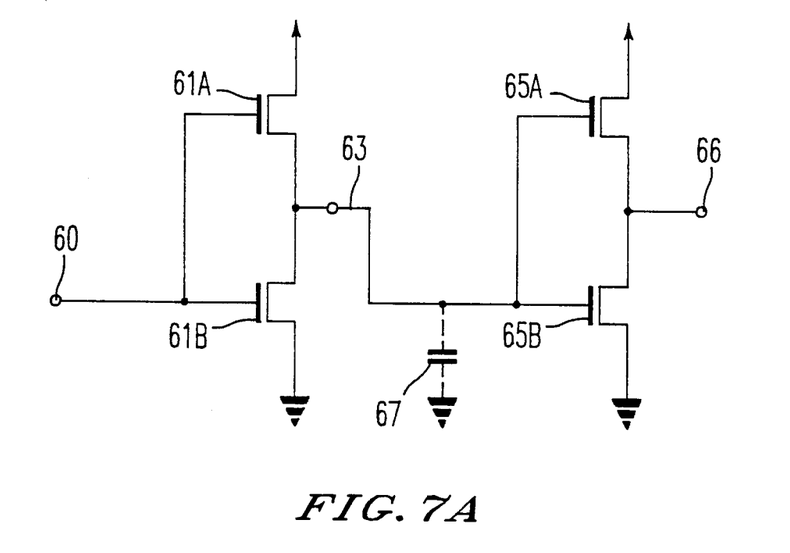
FIG. 7A is a diagram for explaining the principle of the present invention.

Prior to providing the detailed description of one embodiment according to the present invention, the principle of this invention will be described using a CMOS (Complementary Metal-Oxide Semiconductor) circuit shown in FIG. 7A as an example. In this example, an electric line is used instead of an optical fiber. In FIG. 7A, a signal from an input port 60 is fed into an input CMOS circuit consisting of an N-channel MOS transistor 61A and a P-channel MOS transistor 61B. An output signal from the input CMOS circuit is fed into an output CMOS circuit through a junction 63. The output CMOS circuit is constituted by an N-channel MOS transistor 65A and a P-channel MOS transistor 65B. An output from the output CMOS circuit is sent to an output port 66. A capacitor 67 is connected between the junction 63 and the ground.

Figure 7B:
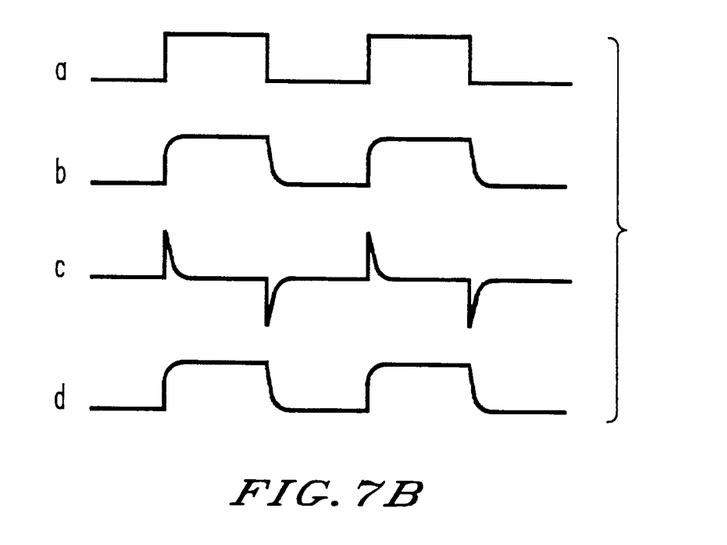
FIG. 7B is a diagram illustrating the waveforms of signals at essential portions shown in FIG. 7A.

FIG. 7B shows the waveforms of signals at essential portions shown in FIG. 7A. Specifically, "a" represents the waveform of signal at the input port 60, and "d" represents the waveform of signal at the output port 66. Further, "b" and "c" represent the waveforms of voltage and current at the junction 63, respectively. The N-channel MOS transistor 61A is operated at the rising edge of the input pulse "a". Thus, a current flows so as to charge the capacitor 67 and the distributed capacity therearound including the input capacitance of the output CMOS circuit. As the capacitor 67 is being charged, a voltage at the junction 63 increases and the charge current decreases. When the voltage at the junction 63 reaches the value of the power source, the voltage remains constant and the N-channel MOS transistor 61A stops its operation. The input impedance of the output CMOS circuit is extremely high except its input capacitance. Thus, the current leakage therearound can be practically neglected. The P-channel MOS transistor 61B then starts to operate in response to the falling edge of the input pulse "a" using the capacitor 67 as a power source, i.e., the discharge. In this case, the N-channel MOS transistor 61A does not operate.

When the charge in the capacitor 67 is completely discharged, the P-channel transistor MOS 61B ends its operation. As described above, the N-channel MOS transistor 61A and the P-channel MOS transistor 61B operate only at the rising edge and the falling edge, respectively. Thus, the power consumption is limited to the power necessary to charge the capacitor 67 and the distributed capacity therearound.

Figure 1B:
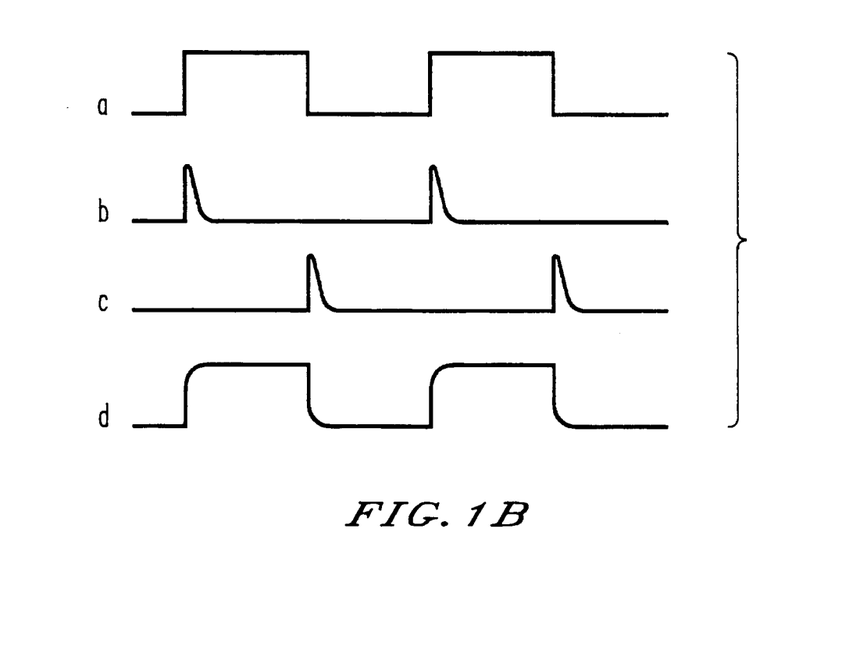
FIG. 1B is a diagram illustrating the waveforms of signals at essential portions shown in FIG. 1A.

Hereinafter, one embodiment according to the present invention will be described. FIGS. 1A and 1B are diagrams for explaining the basic concept of the present invention. FIG. 1A is a block diagram schematically illustrating an optical transmission system. FIG. 1B is a time chart illustrating the relationship of waveforms at the essential portions in the system.

In FIG. 1A, the system comprises an input port 10, a conversion circuit 11, first and second light-emitting elements 12A and 12B, first and second optical fibers 13A and 13B, first and second light-receiving elements 14A and 14B, a conversion circuit 15, and an output port 16. Assume that the input port 10 receives a rectangular pulse "a", as shown in FIG. 1b. The conversion circuit 11 converts the received pulse "a" into two different pulses "b" and "c". The pulses "b" and "c" are respectively synchronized with the rising edge and the falling edge of the input pulse "a". Further, both the pulses "b" and "c" have pulse widths significantly narrower than that of the pulse "a". The pulse "b" is fed into the first light-emitting element 12A, and the pulse "c" is fed into the second light-emitting element 12B so as to respectively generate light pulses having pulse widths significantly narrower than that of the pulse "a". The thus generated light pulses are separately fed into the conversion circuit 15 by way of the first and second optical fibers 13A and 13B, and first and second light-receiving elements 14A and 14B. The conversion circuit 15 generates a pulse equivalent to the pulse "a" from the two received pulses. As can be seen from the waveforms "b" and "c" shown in FIG. 1B, the pulses always have a positive polarity. This differs from the waveforms in the electric signal transmission system shown in FIGS. 7A and 7B.

Figure 2:
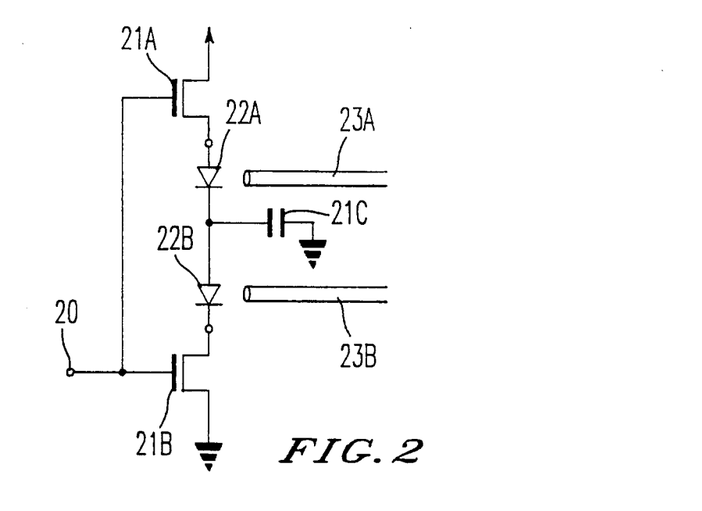
FIG. 2 is a diagram illustrating a specific example of the transmitter portion shown in FIG. 1A.

FIG. 2 shows a circuit configuration of a transmitter side of one embodiment according to the present invention. First and second light-emitting diodes 22A and 22B are connected in series to an N-channel MOS transistor 21A and a P-channel MOS transistor 21B, as shown in FIG. 2. A capacitor 21C is connected to the midpoint of the first and second light-emitting diodes 22A and 22B. The N-channel MOS transistor 21A operates in response to the rising edge of an input pulse received at an input port 20, and then charges the capacitor 21C. This charge current causes the first light-emitting diode 22A to emit light. In this case, the intensity of light emitted from the diode 22A is proportional to the amount of charge current of the capacitor 21C. Thus, the light intensity decreases logarithmically from the initial value determined by the capacitance of the capacitor 21C and the power source voltage. Further, the light intensity reduces to zero at a time when the charging of the capacitor 21C has ended. The P-channel MOS transistor 21B operates in response to the falling edge of the input pulse at the input port 20 so as to discharge the charge stored in the capacitor 21C. This discharge current causes the second light-emitting diode 22B to emit light. In this case, the intensity of light emitted from the diode 22B also decreases logarithmically from the initial value.

Figure 3A:
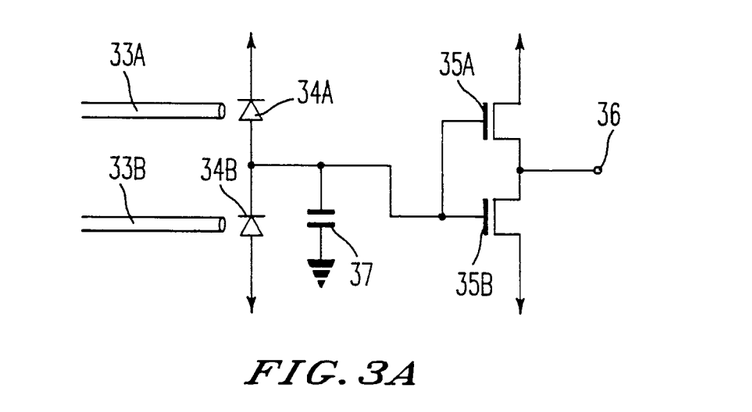
FIG. 3A is a diagram illustrating a specific example of the receiver portion shown in FIG. 1A.

The operation of the receiver side will be described with reference to FIGS. 3A and 3B. FIG. 3A shows a circuit configuration of the receiver side in which first and second PIN-type photodiodes 34A and 34B are connected in series. The midpoint of the first and second PIN-type photodiodes 34A and 34B is connected both to a capacitor 37, and to an input of a CMOS circuit which consists of an N-channel MOS transistor 35A and a P-channel MOS transistor 35B.

In FIG. 3A, the first photodiode 34A receives a light pulse, whose pulse width has been significantly narrowed, from a first optical fiber 33A. The photodiode 34A then converts the received light pulse into a current so as to charge the capacitor 37. Further, the second photodiode 34B receives a light pulse, whose pulse width has been significantly narrowed, from a second optical fiber 33B. The second photodiode 34B then converts the received light pulse into a current so as to discharge the charge from the capacitor 37. The voltage across the capacitor 37 may be compared to the original electric pulse signal to be transmitted. The voltage across the capacitor 37 rises and falls at the rising edge and the falling edge of the original electric pulse, respectively. Namely, the original electric pulse has been regenerated. The voltage across the capacitor 37 is fed into the inputs of the N-channel MOS 35A and the P-channel MOS 35B so as to produce an output at an output port 36. In some cases, the capacitor 37 may be replaced with the input capacitance of a subsequent stage CMOS circuit depending on the system specifications. Similarly, the capacitor 21C on the transmitter side may also be replaced with the stray capacitance of the first and second light-emitting diodes 22A and 22B shown in FIG. 2.

Figure 3B:
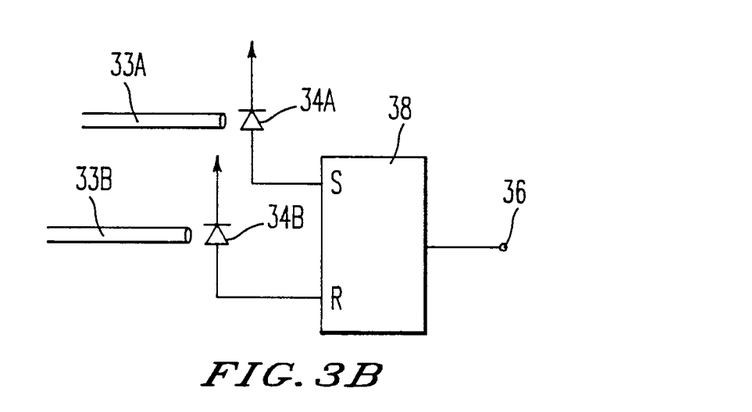
FIG. 3B is a diagram illustrating another specific example of the receiver portion shown in FIG. 1A.

FIG. 3B shows a circuit configuration on the receiver side in which a set/reset-type flip-flop circuit 38 is employed. The flip-flop circuit 38 receives the two light pulses whose pulse widths have been narrowed from optical fibers 33A and 33B through light-emitting diodes 34A and 34B. The flip-flop circuit 38 holds an output at an output port 36 during the period between a time at which the diode 34A sets the circuit 38 and a time at which the diode 34B resets the circuit 38. Thus, the flip-flop circuit 38 serves to restore the original electric pulse.

In this embodiment, light-emitting diodes are used as semiconductor light-emitting elements, and PIN-type photodiodes are used as semiconductor light-receiving elements. However, other light-emitting elements such as semiconductor lasers may be used, and other light-receiving elements may also be used. In the case of optical interconnection between chips mounted on a printed circuit board, the output power of the light-emitting elements must be much smaller than the few milliwatts (mW) which are normally used in optical communications. This is caused by the inevitable restrictions in the process of manufacturing, and extremely limited power consumption in operation. For this reason, a two-terminal bistable element, which can amplify received light while converting it into electrical output, is used as a light-receiving element.

Figure 4A:
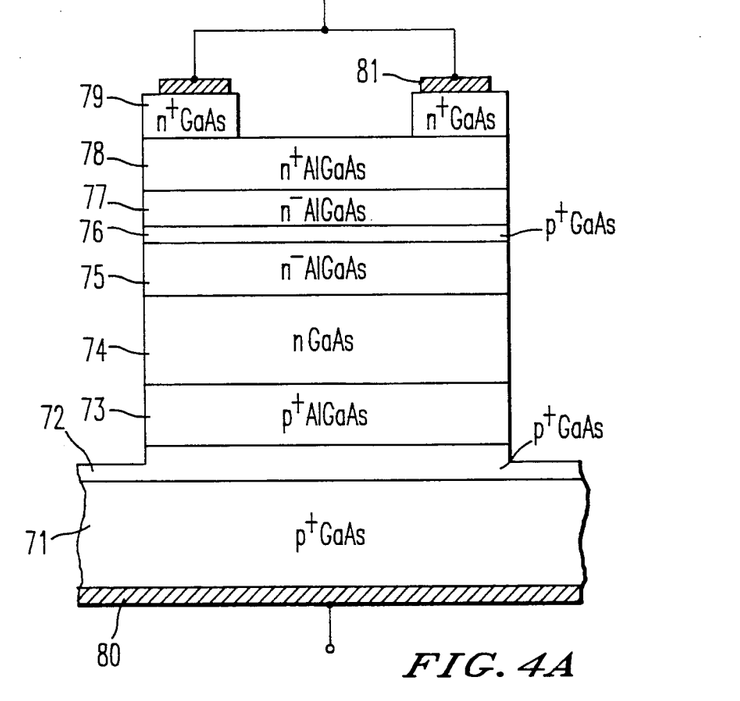
FIG. 4A is a cross-sectional view illustrating a light-receiving element to be used in one embodiment according to the present invention.
Figure 4B:
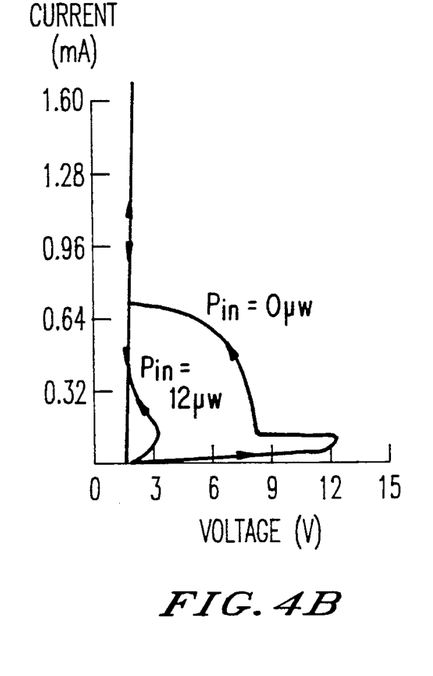
FIG. 4B is a graph illustrating the current-voltage characteristics of the element shown in FIG. 4A.
Figure 4C:
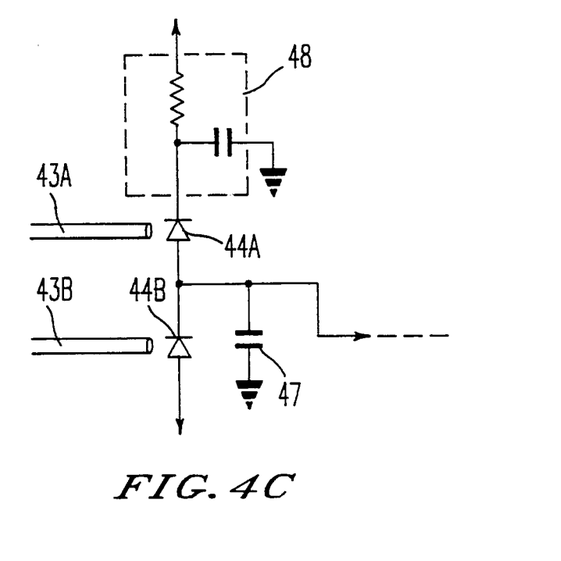
FIG. 4C is a diagram illustrating a receiver portion employing the elements shown in FIG. 4A.

FIG. 4A shows the internal structure of such a two-terminal bistable element. FIG. 4B is a graph illustrating the current-voltage characteristics of the element shown in FIG. 4A. FIG. 4C is a diagram illustrating a light-receiving circuit wherein two elements shown in FIG. 4A are employed. In FIG. 4A, an n-type GaAs layer (a first semiconductor layer) 74 having thickness of about 1 μm serves as a light-emitting layer. An n⁻-type AlGaAs layer (a second semiconductor layer) 75 has an inhibit band width greater than that of the layer 74. A p⁺-type AlGaAs layer (a third semiconductor layer) 73 and the layer 75 are clad layers having thickness of 4800 Å and 3500 Å, respectively. The layer 74 is sandwiched between the layer 75 and the layer 73 so as to constitute a double hetero-junction structure. This is formed on a P⁺-type GaAs substrate 71 through a P⁺-type GaAs buffer layer 72. Further, an n⁻-type AlGaAs layer (a fifth semiconductor layer) 77 is formed on the layer 75 through a p⁺-type GaAs layer (a fourth semiconductor layer) 76 of a very thin film having a high-impurity concentration. Specifically, the layer 76 is about 40 Å thick having a carrier concentration of $5 \times 10^{18}/cm^3$ or more, for example. The layer 77 serves as a clad layer with respect to the layer 76. Further, an n⁺-type AlGaAs layer 78 and an n⁺-type GaAs layer 79 is formed on the layer 77. The layers 78 and 79 serve as emitter layers. The layers 77 and 78 are about 800 Å and about 4000 Å in thickness, respectively.

The layers 75 and 77 are low-concentration layers having a carrier concentration of about $5 \times 10^{15}/cm^3$. The above-described semiconductor layers are manufactured by use of a molecular beam epitaxial technique. The growth temperature in the process of manufacturing the layers is about 700° C. An anode electrode (a first main electrode) 80 is formed on the backside of the substrate 71. Further, a cathode electrode (a second main electrode) 81 is formed on the layer 79.

More detailed information on the above-semiconductor element has been disclosed in the following references:

(1) R. S. Mand, et al; Electron. Lett., 22,952 (1986), and (2) R. S. Mand, et al; Communication Review ED86-113. The above-described element is basically formed in a PNPN configuration, i.e., the element maintains a so-called optical bistable state. In the case of the element used in this invention, a small optical input power can produce a large output current, as shown in FIG. 4B. Specifically, assume that a voltage of about 10 V is applied across the element and an optical power of about 12 μW is input to the element. The element is then turned ON, and produces an output current of 1 mA or more. This means that the element can amplify the input optical power so as to produce a large output current. The amplification characteristic of the element is advantageous when the element is applied to the optical interconnection between chips on the board. However, the element continues in the ON state as long as the voltage is being applied across the element. Thus, a time limit circuit 48 is provided, as shown in FIG. 4C. The circuit 48 allows a current to flow only in the periods of the rising edge and the falling edge in the pulse of this invention.

Figure 5:
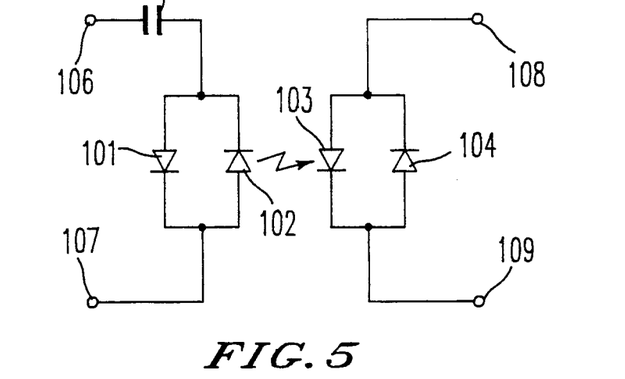
FIG. 5 is a diagram illustrating another embodiment according to the present invention.
Figure 6:
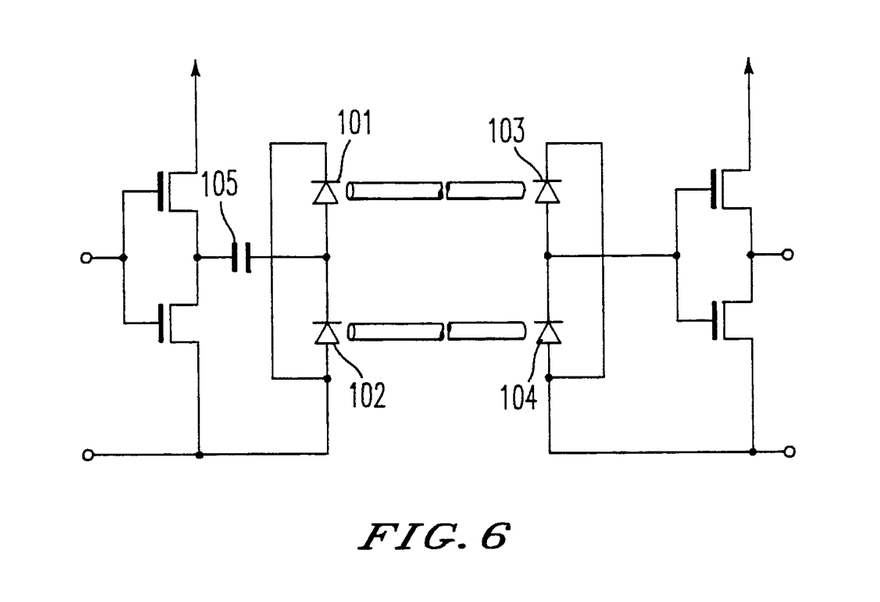
FIG. 6 is a diagram illustrating still another embodiment according to the present invention.

FIG. 5 shows a modification of this embodiment according to the present invention. In FIG. 5, first and second light-emitting diodes 101 and 102 are connected in an inverse-parallel fashion. A capacitor 105 is connected between an input terminal 106 and one end of the diodes 101 and 102. When an electric rectangular pulse is input between the terminal 106 and a terminal 107, light pulses such as those "b" and "c" shown in FIG. 1B are produced from the diodes 101 and 102. The thus produced light pulses are respectively applied to first and second photodiodes 103 and 104, both of which have a certain self-capacitance. An output current of one of the photodiodes 103 and 104 charges the self-capacitance of both, while an output current of the other of the photodiodes 103 and 104 discharges the self-capacitance of both. As a result, a substantially rectangular pulse voltage is produced between output terminals 108 and 109. In this case, the output voltage is not more than the forward voltage drop of the photodiodes 103 and 104, i.e., between about 0.5 V through about 1.0 V. Practically, a circuit configuration shown in FIG. 6 is employed. As seen from FIG. 6, a conventional CMOS circuit can be adapted to this circuit with substantially no change. This is advantageous for use in general applications.

The power consumption in this embodiment will be compared with that in the case of the conventional system. In the conventional system shown in FIG. 8A, power consumption $P_1$ can be obtained by the following equation:

$$P_1 = V_i I_i D \tag{1}$$

where $V_i$ represents an input voltages, $I_i$ represents an input current, and D represents a pulse duty ratio. Further, the following equation can also be held:

$$V_o = \eta I_i R_1 \tag{2}$$

$$P_1 = (V_i V_o D)/(\eta R_1) \tag{3}$$

where $V_o$ represents an output voltage, $\eta$ represents a current transfer coefficient, and $R_1$ are represents an output load resistance. On the other hand, power consumption $P_2$ in the case of this invention can be expressed by the following equation:

$$P_2 = (V_i/T) \int I_i dt \tag{4}$$

where T represents pulse period, and others represent the same as above. Further, stored charge $Q_o$ can be obtained by the following equation;

$$Q_o = C_p V_o = \eta \int I_i dt \tag{5}$$

where $C_p$ represents a receiver side storage capacitance, and others represent the same as above. Therefore, the power consumption $P_2$ can be expressed by the following equation:

$$P_2 = (V_i V_o C_p)/(\eta T) \tag{6}$$

As a result, the ratio of power consumption in the cases of the conventional system and the system of this invention can be expressed in the following equation by use of the equations (3) and (6):

$$P_2/P_1 = (C_p R_1)/(D \cdot T) \tag{7}$$

The value of an output load resistance $R_1$ is determined by circuit conditions such as the current transfer coefficient, and the input impedance of a subsequent circuit.

Thus, it is understood that the advantages become greater as the receiver side storage capacitance becomes smaller. For example, assume that a signal of 10 Mb/s (T=100 ns) and of NRZ (Non-Return-to-Zero, D=0.5) is input to the system of this invention with Cp=1pF and R1=1 KΩ. In this case, the system of this invention can be operated by power of about 2% of that in the case of the conventional system. Further, even in the case of a signal of 100 Mb/s, the system of this invention can be operated by power of about 20% of that in the case of the conventional system.

As described above, according to the present invention, there can be provided an optical transmission system that has the following three major advantages.

First, the transmitter side of the system generates two light pulses, each pulse having a pulse width extremely narrow when compared with that of an original pulse to be transmitted. One of the two light pulses is synchronized with the rising edge of the original pulse. The other light pulse is synchronized with the falling edge of the original pulse. Thus, power is consumed only at the edges of the pulse to be transmitted. As a result, the power consumption can be significantly reduced when compared to that in a conventional optical transmission system. Second, the receiver side of the system of this invention comprises two optical bistable elements as light-receiving elements, which can amplify smaller input light pulses while converting the same into electric pulses. This is advantageous in the case of the optical interconnection between chips on a printed circuit board, wherein light pulses can be transmitted are lower in power than in other cases. Third, two optical fibers are used in the system of this invention. The two light pulses generated on the transmitter side are separately transmitted by use of the respective optical fibers. Thus, the receiver side can assuredly discriminate which of the two light pulses corresponds to the rising edge of the original pulse and which light pulse corresponds to the falling edge of the original pulse. As a result, the original pulse can be regenerated without fail.

Obviously, numerous additional modifications and variations of the present invention are possible in light of the above teaching. It is therefore to be understood that within the scope of the appended claims, the invention may be practiced otherwise than as specifically described herein.

What is claimed is:

1. An optical transmission system for transmitting a first electrical signal having a rising edge and a falling edge, comprising:
   a first generating means for generating a first light pulse in response to the rising edge of said first electric signal;
   a second generating means for generating a second light pulse in response to the falling edge of said first electric signal;
   a first transmitting means for transmitting said first light pulse;
   a second transmitting means for transmitting said second light pulse;
   a first receiving means for receiving said first light pulse transmitted by said first transmitting means;
   a second receiving means for receiving said second light pulse transmitted by said second transmitting means;
   means for generating a second electric signal corresponding to said first electric signal in response to said first and second light pulses received by said first and second receiving means.

2. The system of claim 1, wherein said first generating means comprises first electric pulse signal generating means for generating a first electric pulse signal in response to the rising edge of said first electric signal to be transmitted, and first light pulse generating means for generating a first light pulse corresponding to the electric pulse signal from said first electric pulse signal generating means, and said second generating means comprises second electric pulse signal generating means for generating a second electric pulse signal in response to the falling edge of said first electric signal to be transmitted, and second light pulse generating means for generating a second light pulse corresponding to the electric pulse signal from said second electric pulse signal generating means.

3. The system of claim 2, wherein said first and second light pulse generating means include semiconductor light-emitting elements.

4. The system of claim 1, wherein said first and second transmitting means include optical fibers.

5. The system of claim 1, wherein said first receiving means comprises first electric signal generating means for converting the first light pulse transmitted by said first transmitting means into a third electric signal, said second receiving means comprises second electric signal generating means for converting the second light pulse transmitted by said second transmitting means into a fourth electric signal, and electric signal generating means for generating said second electric signal in accordance with the third and fourth electric signals generated by said first and second electric signal generating means.

6. The system of claim 5, wherein said first and second electric signal generating means include semiconductor light-receiving elements.

7. The system of claim 6, wherein said semiconductor light-receiving element includes a two-terminal bistable element.

8. An optical transmitting system for transmitting a first electric signal having a rising edge and a falling edge, comprising:
   a first electric pulse generating means for generating a first electric pulse in response to the rising edge of said first electric signal;
   a first light pulse generating means for generating a first light pulse corresponding to said first electric pulse;
   a second electric pulse generating means for generating a second electric pulse in response to the falling edge of said first electric signal;
   a second light pulse generating means for generating a second light pulse corresponding to said second electric pulse;
   a first connection means for connecting between said first and second light pulse generating means;
   a first capacitor means being provided to said first connection means;
   a first light pulse receiving means for receiving said first light pulse;
   a second light pulse receiving means for receiving said second light pulse;
   a second connection means for connecting between said first and second light pulse receiving means;
   a second capacitor means being provided to said second connection means;

a first light transmitting means for transmitting said first light pulse, and being provided between said first light pulse generating means and said first light pulse receiving means;

a second light transmitting means for transmitting said second light pulse, and being provided between said second light pulse generating means; and means for generating a second electric signal corresponding to said first electric signal in response to said first and second light pulses received by said first and second light pulse receiving means.

9. The system of claim 8, wherein said first and second light pulses generating means include semiconductor light-emitting elements, said first and second light pulse receiving means include semiconductor light-receiving elements and said first and second light transmitting means include optical fibers.

10. An optical transmitting system for transmitting a first electric signal having a rising edge and a falling edge, comprising:

a first p-channel MOS transistor means for generating a first electric pulse in response to the rising edge of said first electric signal, and having a gate electrode, a source electrode and a drain electrode;

a first n-channel MOS transistor means for generating a second electric pulse in response to the falling edge of said first electric signal, and having a gate electrode, a source electrode and a drain electrode;

a first connection means for connecting between said gate electrodes of said first p-channel and second n-channel MOS transistors;

an input terminal means for inputting said first electric signal, and being connected to said first connection means;

a first semiconductor light-emitting diode means for generating a first light pulse corresponding to said first electric pulse, and being connected to said drain electrode of said first p-channel MOS transistor;

a second semiconductor light-emitting diode means for generating a second light pulse corresponding to said second electric pulse, and being connected to said drain electrode of said first n-channel MOS transistor;

a second connection means for connecting between said first and second semiconductor light-emitting diodes;

a first capacitor means being provided to said second connection means;

a first optical fiber means for transmitting said first light pulse, and being coupled on one end of said first optical fiber to said first semiconductor light-emitting diode means;

a second optical fiber means for transmitting said second light pulse, and being coupled on one end of said second optical fiber to said second semiconductor light-emitting diode means;

a first semiconductor light-receiving diode means being coupled to another end of said first optical fiber means, for receiving said first light pulse transmitted through said first optical fiber means, and for generating a third electric pulse in response to said first light pulse;

a second semiconductor light-receiving diode means being coupled to another end of said second optical fiber means, for receiving said second light pulse transmitted through said second optical fiber means, and for generating a fourth electric pulse in response to said second light pulse;

a third connection means for connecting between said first and second semiconductor light-receiving diodes;

a second capacitor means being provided to said third connection means;

a second p-channel MOS transistor means having a gate electrode, a source electrode and a drain electrode;

a second n-channel MOS transistor means having a gate electrode, a source electrode and a drain electrode;

a fourth connection means for connecting between said gate electrodes of said second p-channel MOS transistor means and said second n-channel MOS transistor means;

a fifth connection means for connecting between said third and fourth connection means;

a sixth connection means for connecting between said drain electrodes of said second p-channel MOS transistor means and said second n-channel MOS transistor means; and an output terminal means being connected to said sixth connection means.

* * * * *